United States Patent
Kumon et al.

(10) Patent No.: US 7,839,303 B2
(45) Date of Patent: Nov. 23, 2010

(54) VEHICLE DETECTING APPARATUS

(75) Inventors: Hiroaki Kumon, Oobu (JP); Kenji Kobayashi, Oobu (JP)

(73) Assignee: Denso Corporation, Kariya (JP)

( * ) Notice: Subject to any disclaimer, the term of this patent is extended or adjusted under 35 U.S.C. 154(b) by 586 days.

(21) Appl. No.: 11/906,979

(22) Filed: Oct. 4, 2007

(65) Prior Publication Data

US 2008/0088481 A1 Apr. 17, 2008

(30) Foreign Application Priority Data

Oct. 11, 2006 (JP) .............................. 2006-278085

(51) Int. Cl.
*G08G 1/017* (2006.01)
(52) U.S. Cl. .................... 340/937; 340/933; 340/425.5; 382/104
(58) Field of Classification Search ................. 340/937, 340/933
See application file for complete search history.

(56) References Cited

U.S. PATENT DOCUMENTS

| | | | |
|---|---|---|---|
| 4,891,559 A * | 1/1990 | Matsumoto et al. ........... 315/82 |
| 5,837,994 A | 11/1998 | Stam et al. | |
| 5,990,469 A | 11/1999 | Bechtel et al. | |
| 6,255,639 B1 | 7/2001 | Stam et al. | |
| 6,469,739 B1 | 10/2002 | Bechtel et al. | |
| 6,587,573 B1 | 7/2003 | Stam et al. | |
| 6,611,610 B1 | 8/2003 | Stam et al. | |
| 6,653,614 B2 | 11/2003 | Stam et al. | |
| 6,728,393 B2 | 4/2004 | Stam et al. | |
| 6,919,548 B2 | 7/2005 | Stam et al. | |
| 6,947,577 B2 | 9/2005 | Stam et al. | |
| 7,566,851 B2 * | 7/2009 | Stein et al. ................. 250/205 |
| 2003/0058346 A1 | 3/2003 | Bechtel et al. | |
| 2003/0123705 A1 | 7/2003 | Stam et al. | |
| 2003/0123706 A1 | 7/2003 | Stam et al. | |
| 2003/0138131 A1 | 7/2003 | Stam et al. | |
| 2003/0138132 A1 | 7/2003 | Stam et al. | |

(Continued)

FOREIGN PATENT DOCUMENTS

JP 2004-189229 7/2004

OTHER PUBLICATIONS

Office action dated Sep. 29, 2009 in corresponding German Application No. 10 2007 048508.7.

*Primary Examiner*—George A Bugg
*Assistant Examiner*—Kerri McNally
(74) *Attorney, Agent, or Firm*—Harness, Dickey & Pierce, PLC (57) ABSTRACT

The vehicle detecting apparatus includes an image sensor mounted on a host vehicle so as to be able to take an image ahead of the host vehicle, a light source area extracting function of extracting, from image data outputted from the image sensor, an area having luminance higher than a predetermined value as a light source area, a vehicle detecting function of detecting existence of at least one of an oncoming vehicle and a preceding vehicle by recognizing which of a headlight of the oncoming vehicle, a taillight of the preceding vehicle, and a roadside reflector causes the light source area in the image data. The vehicle detecting function is configured to lower a probability that the vehicle detecting function recognizes that the light source area is caused by the roadside reflector when the headlight of the host vehicle is in a low-beam position.

12 Claims, 8 Drawing Sheets

U.S. PATENT DOCUMENTS

| | | |
|---|---|---|
| 2004/0143380 A1 * | 7/2004 | Stam et al. .................... 701/36 |
| 2005/0242740 A1 | 11/2005 | Stam et al. |
| 2006/0018512 A1 | 1/2006 | Stam et al. |
| 2006/0091813 A1 | 5/2006 | Stam et al. |
| 2006/0177098 A1 | 8/2006 | Stam |
| 2008/0129206 A1 * | 6/2008 | Stam et al. .................... 315/82 |

* cited by examiner

VEHICLE DETECTING APPARATUS

CROSS-REFERENCE TO RELATED APPLICATION

This application is related to Japanese Patent Application No. 2006-278085 filed on Oct. 11, 2006, the contents of which are hereby incorporated by reference.

BACKGROUND OF THE INVENTION

1. Field of the Invention

The present invention relates to a vehicle detecting apparatus for detecting a preceding vehicle or an oncoming vehicle at night, and a headlight control system using such a vehicle detecting apparatus.

2. Description of Related Art

There is known a vehicle-mounted driving support system configured to provide indication or annunciation to a vehicle driver upon detecting a preceding vehicle or an oncoming vehicle, and to perform controls on vehicle-mounted devices, such as control of a vertical light axis (high-beam direction or low-beam direction) of a headlight, and operation of windshield wipers, to thereby reduce the driver's strain. This vehicle-mounted driving support system needs to accurately detect a preceding vehicle or an oncoming vehicle to control the vehicle-mounted devices in an appropriate manner.

Examples of the vehicle detecting apparatuses for detecting a preceding vehicle or an oncoming vehicle at night include the one which is constituted by an image sensor and an image processing device processing an image taken by the image sensor. Japanese Patent Application Laid-open No. 2004-189229 discloses such an apparatus including an optical system obtaining an image of a view ahead of a vehicle on which it is mounted, and an image processing system processing the image taken by the optical system to detect a taillight of a preceding vehicle, or a headlight of an oncoming vehicle. This apparatus is configured to recognize intense white light of a headlight of a preceding vehicle, or intense red light of a taillight in order to detect the preceding vehicle or oncoming vehicle. This is made possible by the fact that the luminance, intensity, and color of a vehicle headlight and a vehicle taillight are prescribed by the regulations.

The optical system of this apparatus includes a first lens formed with a red filter dye and a second lens formed with a greenish blue filter dye, and configured to converge an incident light to two different points on an image sensor thereof. A red component of the incident light is extracted by the first lens, and a blue component of the incident light is extracted by the second lens. If the luminance of the extracted red or blue component exceeds a predetermined value, it is determined that a taillight of a preceding vehicle or a headlight of an oncoming vehicle has been detected.

However, the above described conventional apparatus having the two lenses with a filtering function for extracting a red or blue component from an incident light has a problem in that the filtering function of those lenses inevitably deteriorates due to its harsh vehicle environment where its ambient temperature varies far and wide. In addition, the provision of those two lenses with the filtering function makes the optical system complicated in structure, and causes the production cost to increase.

Accordingly, there has been desired a configuration capable of detecting a taillight of a preceding vehicle and a headlight of an oncoming vehicle on the basis of only monochrome (luminous) information of the illumination lights of them, so that it does not need to use color information of them.

However, such a configuration has not been put into practice so far for the following reasons. In an image of a picture taken by a vehicle-mounted camera, there is shown not only the light from a taillight of a preceding vehicle or a headlight of an oncoming vehicle, but also ambient light, for example, light from a roadside reflector. Accordingly, to correctly detect a preceding vehicle and an oncoming vehicle at night, it becomes necessary to distinguish the light from the taillight of the preceding vehicle or the headlight of the oncoming vehicle from ambient light, especially light from a roadside reflector. It should be noted that although such a reflector does not emit light itself, it is shown as a light source in a picture image taken by the camera, because it reflects the light emitted from a headlight of a vehicle on which the vehicle detecting apparatuses is mounted.

SUMMARY OF THE INVENTION

The present invention provides a vehicle detecting apparatus comprising:

an image sensor mounted on a host vehicle so as to be able to take an image ahead of the host vehicle and outputting image data representing the image;

a light source area extracting function of extracting, from the image data, an area having luminance higher than a predetermined value as a light source area;

a vehicle detecting function of detecting existence of at least one of an oncoming vehicle and a preceding vehicle by recognizing which of a headlight of the oncoming vehicle, a taillight of the preceding vehicle, and a roadside reflector causes the light source area in the image data; and a headlight axis position detecting function of detecting whether a headlight of the host vehicle is in a high-beam position or a low-beam position;

wherein the vehicle detecting function is configured to lower a probability that the vehicle detecting function recognizes that the light source area is caused by the roadside reflector when the headlight of the host vehicle is detected to be in the low-beam position by the headlight axis position detecting function.

The present invention also provides a vehicle headlight control system comprising:

an image sensor mounted on a host vehicle so as to be able to take an image ahead of the host vehicle and outputting image data representing the image;

a light source area extracting function of extracting, from the image data, an area having luminance higher than a predetermined value as a light source area;

a vehicle detecting function of detecting existence of at least one of an oncoming vehicle and a preceding vehicle by recognizing which of a headlight of the oncoming vehicle, a taillight of the preceding vehicle, and a roadside reflector causes the light source area in the image data;

a headlight axis position detecting function of detecting whether a headlight of the host vehicle is in a high-beam position or a low-beam position; and a headlight actuator device controlling the illuminating position between the high-beam position and the low-beam position in accordance with detection result by the vehicle detecting function;

wherein the vehicle detecting function is configured to lower a probability that the vehicle detecting function recognizes that the light source area is caused by the roadside reflector when the headlight of the host vehicle is detected to be in the low-beam position by the headlight axis position detecting function.

According to the present invention, it is possible to detect existence of an oncoming vehicle or a preceding vehicle reliably and correctly, because the present invention does not need any lens with filtering function which cannot be preventing from deteriorating due to its harsh vehicle environment where its ambient temperature varies far and wide.

The vehicle detecting function may have a first kind likelihood calculating function of calculating a first kind of a headlight likelihood indicative of a probability of the light source area being caused by the headlight of the oncoming vehicle, a taillight likelihood indicative of a probability of the light source area being caused by the taillight of the preceding vehicle, and a reflector likelihood indicative of a probability of the light source area being caused by the roadside reflector, and a second kind likelihood calculating function of calculating a second kind of a headlight likelihood indicative of a probability of the light source area being caused by the headlight of the oncoming vehicle, a taillight likelihood indicative of a probability of the light source area being caused by the taillight of the preceding vehicle, and a reflector likelihood indicative of a probability of the light source area being caused by the roadside reflector such that the second kind of the reflector likelihood becomes smaller than the second kind of the headlight and taillight likelihoods when the headlight of the host vehicle is detected to be in the low-beam position. In this case the vehicle detecting function is configured to multiply each of the first kind of the headlight, taillight, and reflector likelihoods by corresponding one of the second kind of the headlight, taillight, and reflector likelihoods to produce an integrated headlight likelihood, an integrated taillight likelihood, and an integrated reflector likelihood, and to determine that the light source area is caused by the headlight of the oncoming vehicle or the taillight of the preceding vehicle if the integrated reflector likelihood is smaller than the integrated headlight and integrated taillight likelihoods.

The vehicle detecting apparatus may further comprise a distance detecting function of detecting a distance to a light source causing the light source area in the image data, and the first kind likelihood calculating function may be configured to calculate the first kind of the headlight, taillight, and reflector likelihoods on the basis of the distance to the light source and luminance of the light source area while referring to a prestored table defining the first kind of the headlight, taillight, and reflector likelihoods as functions of a distance to the light source and luminance of the light source area.

The distance detecting function may be configured to detect the distance by utilizing a fact that a left side lamp and a right side lamp of a vehicle headlight or a vehicle taillight are spaced by about a certain distance.

The vehicle detecting apparatus may further comprise a vehicle behavior sensor detecting behavior of the host vehicle, and the distance detecting function may be configured to detect the distance to the light source on the basis of a position of the light source area in the image data while compensating for deviation of an image taking direction of the image sensor from a predetermined reference direction on the basis of behavior of the host vehicle detected by the vehicle behavior sensor.

The first kind likelihood calculating function may calculate the first kind of the headlight, taillight, and reflector likelihoods on the basis of a shape of the light source area in the image data.

The first kind likelihood calculating function may be configured to make a judgment as to whether the light source area is moving or stationary on the basis of a position of the light source area in a plurality of sets of image data successively taken by the image sensor, and to calculate the first kind of the headlight, taillight, and reflector likelihoods depending on a result of the judgment.

The first kind likelihood calculating function may be configured to calculate the first kind of the headlight, taillight, and reflector likelihoods in accordance with different calculation methods individually, and perform multiplication among a plurality of the first kind of the headlight likelihoods calculated in accordance with the different calculation methods, among a plurality of the first kind taillight likelihoods calculated in accordance with the different calculation methods, and among a plurality of the first kind of the reflector likelihoods calculated in accordance with the different calculation methods, to thereby calculate a combined headlight likelihood, a combined taillight likelihood, and a combined reflector likelihood.

The second kind likelihood calculating function may be configured to calculate the second kind of the headlight, taillight, and reflector likelihoods at the same value when the headlight of the host vehicle is detected to be in the high-beam position.

The second kind likelihood calculating function may be configured to calculate the second kind of the headlight, taillight, and reflector likelihoods such that the second kind of the headlight and taillight likelihoods become higher than the second kind of the reflector likelihood when the headlight of the host vehicle is detected to be in the low-beam position.

The vehicle detecting apparatus may further comprise a distance detecting function of detecting a distance to a light source causing the light source area in the image data, and the second kind likelihood calculating function may be configured to calculate the second kind of the headlight, taillight, and reflector likelihoods such that the second kind of the headlight and taillight likelihoods become higher than the second kind of the reflector likelihood when the distance measured by the distance detecting function is longer than a predetermined distance.

The second kind likelihood calculating function may be configured to calculate the second kind of the headlight, taillight, and reflector likelihoods such that the second kind of the reflector likelihood becomes higher than the second kind of the headlight and taillight likelihoods when the light source area is such that the light source area does not appear in image data taken by the image sensor when the headlight of the host vehicle is in the low-beam position, and appears in image data taken by the image sensor after switching of the headlight of the host vehicle from the low-beam position to the high-beam position.

Other advantages and features of the invention will become apparent from the following description including the drawings and claims.

PREFERRED EMBODIMENTS OF THE INVENTION

Figure 1:
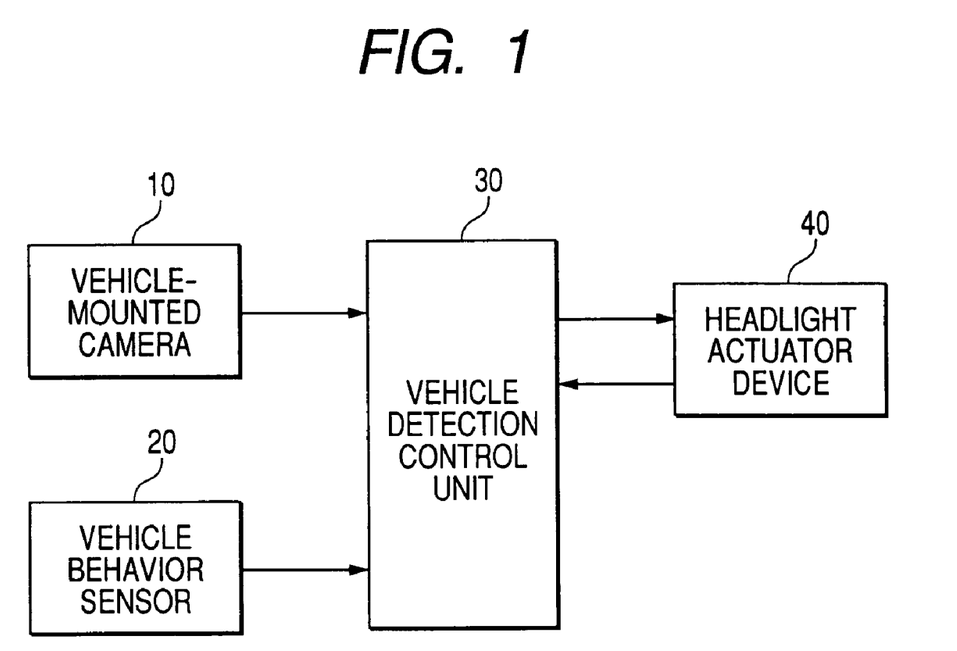
FIG. 1 is a diagram showing a structure of a headlight control system including a vehicle detecting apparatus according to an embodiment of the invention.

FIG. 1 is a diagram showing a structure of a headlight control system including a vehicle detecting apparatus according to an embodiment of the invention. As shown in FIG. 1, this system includes a vehicle-mounted camera 10, a vehicle behavior sensor device 20, a vehicle detecting apparatus 30, and a headlight actuator device 40.

The camera 10, which includes therein an image sensor with light-receiving elements such as CCDs, is mounted on a vehicle (may be referred to as a host vehicle hereinafter) so as to be able to take a picture of a view ahead of the host vehicle.

The camera 10 is configured to be able to adjust its shutter speed, its frame rate, and a gain of digital signals outputted therefrom to the vehicle detecting apparatus 30 in accordance with commands outputted from a not shown control section thereof. The camera 10 provides the vehicle detecting apparatus 30 with image data of a picture which it has taken together with horizontal and vertical sync signals. The image data is constituted by digital signals indicating monochrome (luminance) of each of pixels constituting the image data.

The vehicle behavior sensor device 20, which may include a stroke sensor mounted on each suspension of the host vehicle, detects attitude change of the host vehicle in the pitch direction and in the roll direction. If the host vehicle has longitudinal and lateral accelerations when it pitches and rolls, the picture taking direction of the camera 10 deviates from a predetermined reference direction. The vehicle behavior sensor device 20 provides the vehicle detecting apparatus 30 with vehicle behavior information used for calculating how the picture taking direction of the camera 10 has deviated from the reference direction.

The vehicle behavior sensor device 20 includes a speed sensor outputting a signal indicative of a speed of the host vehicle, and a yaw rate sensor outputting a signal indicative of a yaw rate of the host vehicle. These signals outputted from the speed sensor and the yaw rate sensor are supplied to the vehicle detecting apparatus 30 as a part of the vehicle behavior information.

When a light source is included in image data of a picture taken by the camera 10, the vehicle detecting apparatus 30 performs image processing on the image data while referring to the vehicle behavior information in order to identify whether the light source is a taillight of a preceding vehicle, or a headlight of an oncoming vehicle, or a roadside reflector. If the light source has been identified as being a taillight of a preceding vehicle, or a headlight of an oncoming vehicle, the vehicle detecting apparatus 30 sends detection information regarding the preceding vehicle or oncoming vehicle.

The headlight actuator device 40 controls the illuminating position (low-beam position or high-beam position) of the headlight of the host vehicle in accordance with the detection information regarding the detected preceding vehicle and/or oncoming vehicle from the vehicle detecting apparatus 30. For example, when the detection information indicates that a distance to the detected preceding vehicle or the detected oncoming vehicle is shorter than a predetermined distance, the headlight actuator device 40 sets the headlight to the low-beam position to avoid a driver of the detected vehicle from dazzling. On the other hand, when the detection information indicates that the distance to the detected vehicle is longer than the predetermined distance, or when any preceding vehicle or oncoming vehicle is not being detected, the headlight actuator device 40 sets the headlight to the high-beam position to provide the driver of the host vehicle with good visibility as distant as possible. Processing the image data outputted from the camera 10 makes it possible to detect a preceding vehicle or an oncoming vehicle from a relatively long distance (600 m, for example), so that the headlight actuator device 40 can control the illuminating position of the headlight in an appropriate manner.

The headlight actuator device 40 takes in a signal outputted from a switch (not shown) which the driver of the host vehicle manipulates to designate the illuminating position of the headlight. And the headlight control device 40 sets the headlight to one of the low-beam position and the high-beam position in accordance the signal taken in from this switch. If a preceding vehicle or an oncoming vehicle is detected to be within a predetermined distance from the host vehicle when the headlight is in the high-beam position, the headlight actuator device 40 automatically changes the headlight from the high-beam position to the low-beam position. And afterwards, when the situation becomes such that any preceding vehicle or an oncoming vehicle is not being detected, the headlight actuator device 40 automatically changes the headlight from the low-beam position to the high-beam position.

The headlight actuator device 40 provides the vehicle detecting apparatus 30 with headlight illuminating position information indicative of which of the high-beam position and the low-beam position the headlight is currently set. Alternatively, the vehicle detecting apparatus 30 may receive the headlight illuminating position information from a sensor provided to detect the illuminating position of the headlight.

Next, explanation is made as to a principle of detecting a preceding vehicle and an oncoming vehicle. When the camera 10 takes a picture of a preceding vehicle and an oncoming vehicle existing at the same distance from the host vehicle at night, a headlight of the oncoming vehicle is shown as a brightest light source, and a taillight of the preceding vehicle is shown as a next brightest light source in the image data of the picture. In a case where a roadside reflector is also included in this picture, it is shown as a light source darker than the taillight of the preceding vehicle, because the reflector does not emit light itself, but only reflects the light emitted from the headlight of the host vehicle.

The light from each of the headlight, taillight and reflector observed on the image sensor side becomes darker with the increase of the distance thereto. That is because, the number of light receiving elements constituting the image sensor which receive the light from a light source decreases with the increase of the distance to the light source.

Since a vehicle-mounted lamp (headlight and taillight) has a roughly fixed size, and its luminance is prescribed by the regulations. Accordingly, there is a correlation between the distance to a light source from the host vehicle and a luminance of the light source observed on the side of the image sensor of the camera 10. The correlation differs for the luminance of the light source. That is, the correlation with a vehicle lamp is different from the correlation with a reflector.

Figure 2:
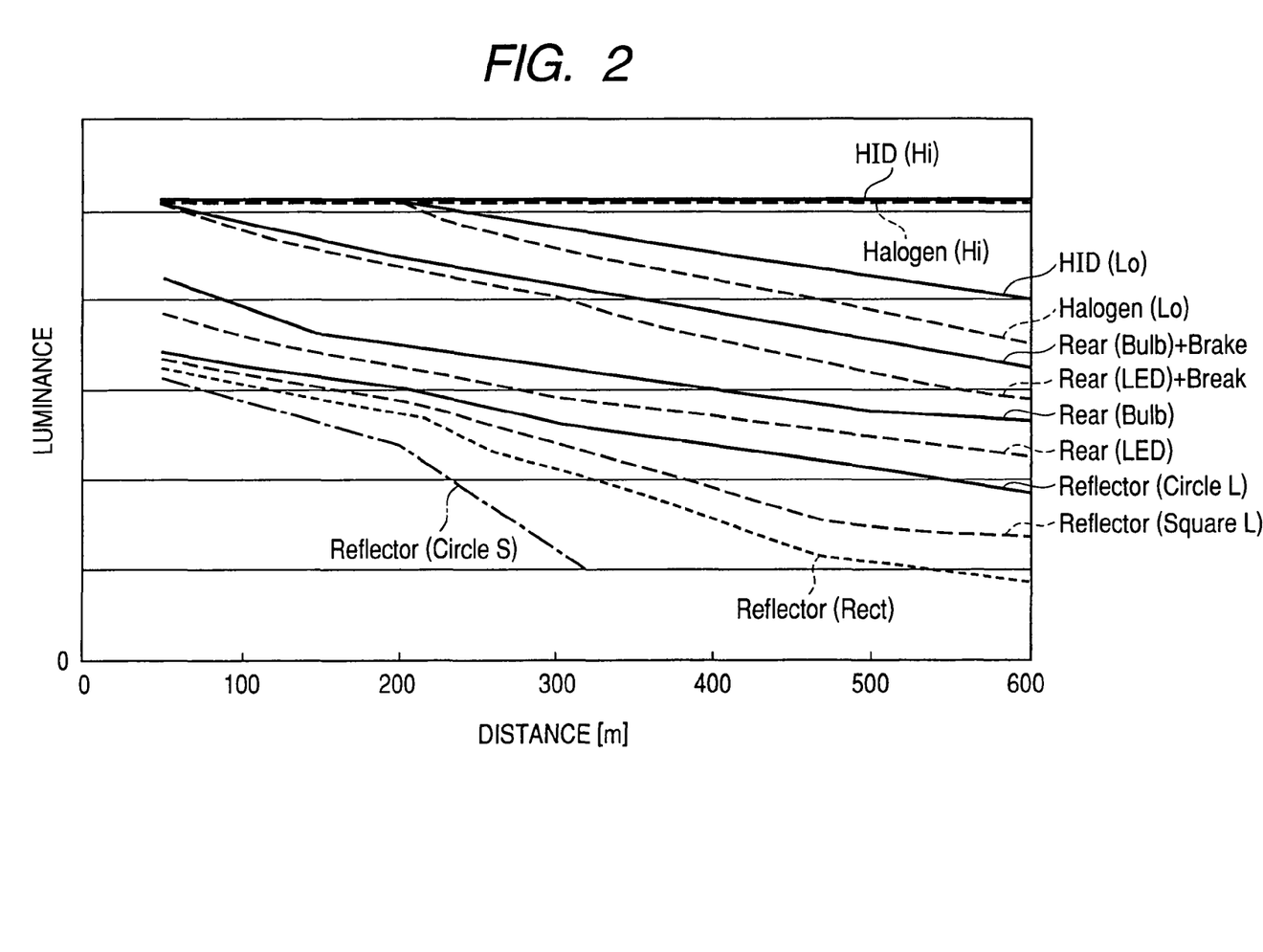
FIG. 2 is a graph showing, for each of various kinds of light sources, a measured correlation between a distance to a light source and a luminance of the light source.

FIG. 2 is a graph showing the measured correlations between the distance and the luminance. As seen from FIG. 2, the luminance of each light source decreases with the increase of its distance from the host vehicle, and the correlation between the luminance and the distance depends on each light source. In FIG. 2, the correlation between the luminance and the distance is shown for each of the different cases.

HID (Lo): The oncoming vehicle has a discharge lamp as a headlight, and it is set in the low-beam position.

HID (Hi): The oncoming vehicle has a discharge lamp as a headlight, and it is set in the high-beam position.

Halogen (Lo): The oncoming vehicle has a halogen lamp as a headlight, and it is set in the low-beam position.

Halogen (Lo): The oncoming vehicle has a halogen lamp as a headlight, and it is set in the low-beam position.

Rear (Bulb)+Brake: The preceding vehicle has a bulb lamp as a taillight, and it is lit together with a brake lamp.

Rear (Bulb): The preceding vehicle has a bulb lamp as a taillight, and it is lit alone.

Rear (LED)+Brake: The preceding vehicle has an LED lamp as a taillight, and it is lit together with a brake lamp.

Rear (LED): The preceding vehicle has a LED lamp as a taillight, and it is lit alone.

Reflector (Circle S): The headlight of the host vehicle is set in the high-beam position, and the reflector reflecting the light from this headlight has a small size and a circular shape.

Reflector (Circle L): The headlight of the host vehicle is set in the high-beam position, and the reflector reflecting the light from this headlight has a large size and a circular shape.

Reflector (Rect): The headlight of the host vehicle is set in the high-beam position, and the reflector reflecting the light from this headlight has a rectangular shape.

Reflector (Square): The headlight of the host vehicle is set in the high-beam position, and the reflector reflecting the light from this headlight has a large size and a square shape.

In this embodiment, a likelihood of a light source brightly shown in the image data of a picture taken by the camera 10 being a headlight of an oncoming vehicle, or a taillight of an head-driving vehicle, and a likelihood of this light source being a reflector.

Figure 3:
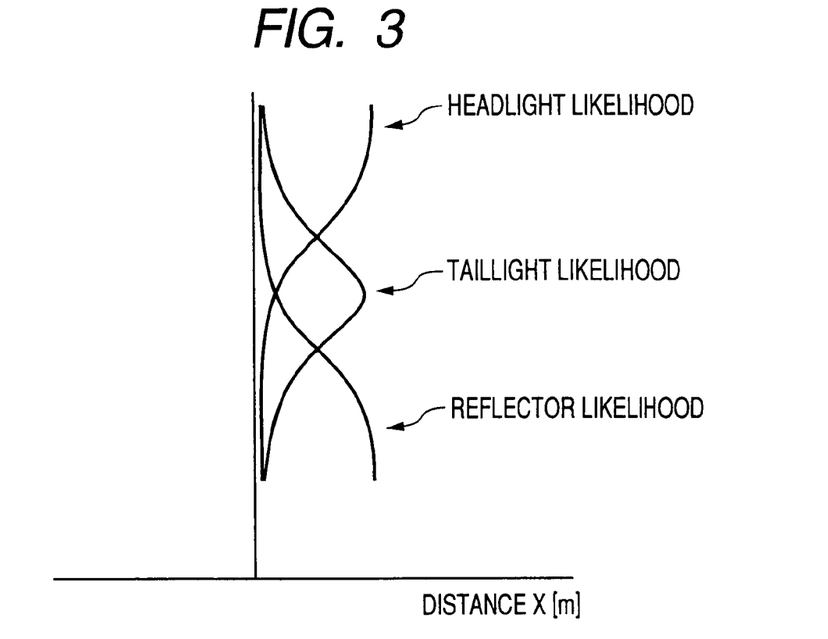
FIG. 3 is a graph showing a curve representing a likelihood of an observed light source area being caused by a headlight, a curve representing a likelihood of the light source area being caused by a taillight, and a curve representing a likelihood of the light source area being caused by a roadside reflector drawn as functions of its luminance and its distance X (m) from the host vehicle.

To be more accurate, in this embodiment, a graph as shown in FIG. 3 in which a curve representing a likelihood of an observed light source being a headlight, a curve representing a likelihood of the light source being a taillight, and a curve representing a likelihood of the light source being a reflector are drawn as functions of its luminance and its distance X (m) from the host vehicle on the basis of the measurement results shown in FIG. 2. This graph is stored in advance. When the camera 10 takes a picture including a light source, each of the above described likelihooods is determined as a first kind of likelihoods by referring to the graph of FIG. 3.

In this embodiment, the above described likelihooods are calculated also taking account of whether the headlight of the host vehicle is in the high-beam position or low-beam position as a second kind of likelihoods for the reason explained below.

When a reflector exists ahead of the host vehicle, and this reflector reflects the light from the headlight of the host vehicle, this reflector may be shown as a light source in the image data of a picture taken by the camera 10. If the headlight has been set in the low-beam position at the time, the possibility of the reflector being shown in the image data as a light source is smaller than if it has been set in the high-beam position, because the light emission range of the headlight is narrower when it is set in the low-beam position than when it is set in the high-beam position.

Figure 10:
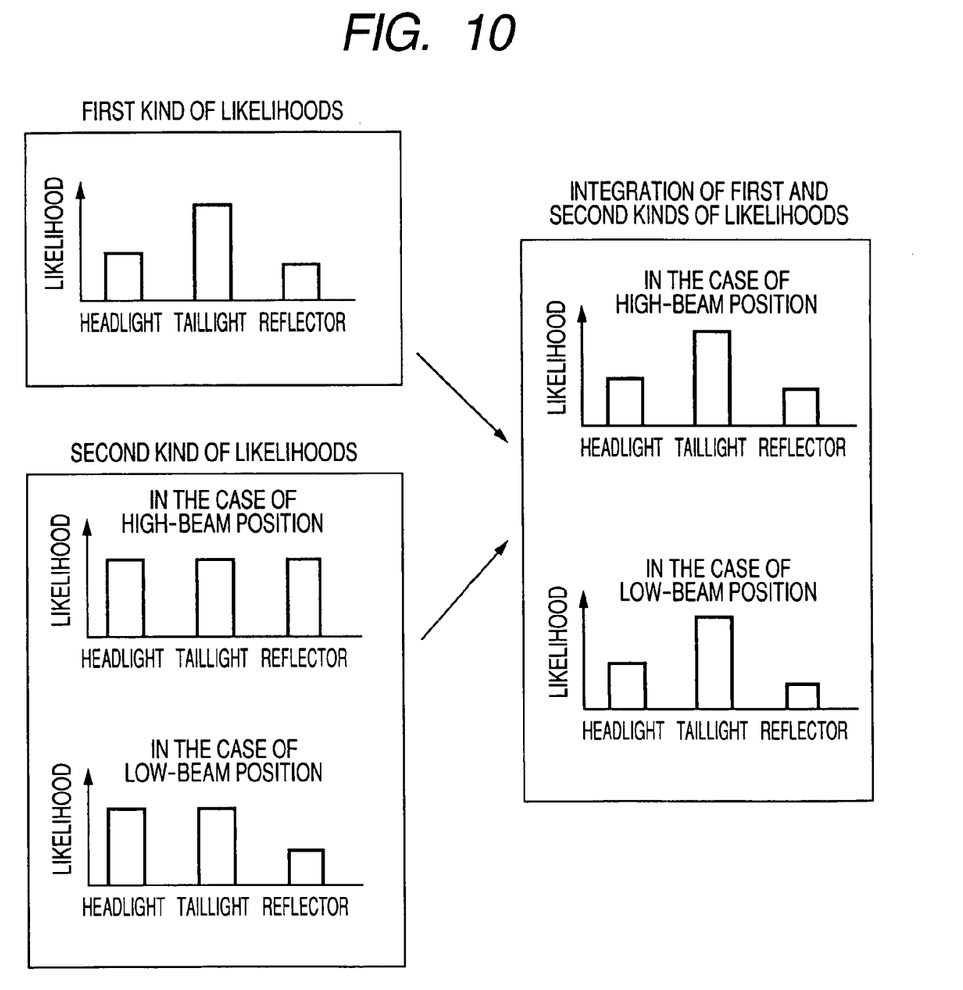
FIG. 10 is a flowchart showing details of a process of integrating a first kind of likelihoods and a second kind of likelihoods performed by the vehicle detecting apparatus.

Accordingly, this embodiment is configured to calculate the second kind of the likelihoods in which in which the reflector likelihood is set lower when the headlight is in the low-beam position as shown in FIG. 10 which is explained in detail later. Each of the first kind of the likelihoods is multiplied by a corresponding one of the second kind of the likelihoods to produce an integrated likelihood. The light source area in the image data is determined to one of a headlight, a taillight and a reflector, which has a largest integrated likelihood.

According to this embodiment, it is possible to prevent the a reflector from being misrecognized as a headlight or a taillight.

Next, the operation of the vehicle detecting apparatus 30 is explained in detail with reference to the flowcharts of FIG. 4 to FIG. 9.

Figure 4:
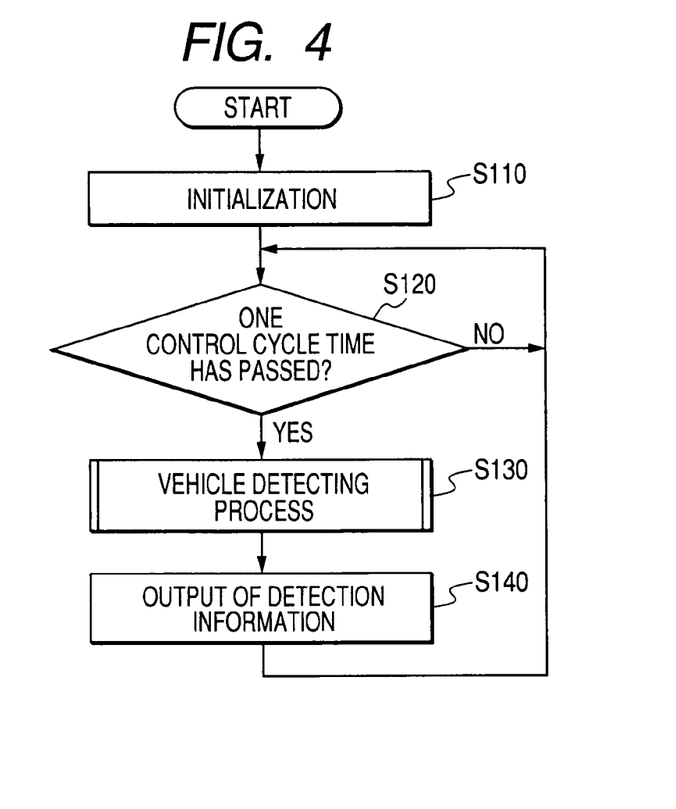
FIG. 4 is a flowchart showing an overall operation of the vehicle detecting apparatus.

FIG. 4 is a flowchart showing a detection control procedure performed by the vehicle detecting apparatus 30. The detection control procedure begins by performing initialization by clearing a memory, and reading a table indicating the likelihood curves as shown in FIG. 3 from a ROM at step S110. At step S120, it is judged whether or not a time corresponding to one control cycle has elapsed from the time when this detection control procedure was last performed. If the judgment at step SS120, the procedure proceeds to step S130 where a vehicle detecting process (to be explained later) is performed. After completion of the vehicle detecting process, the procedure proceeds to step S140 where the detection information obtained by the vehicle detecting process is sent to the headlight actuator device 40.

Figure 5:
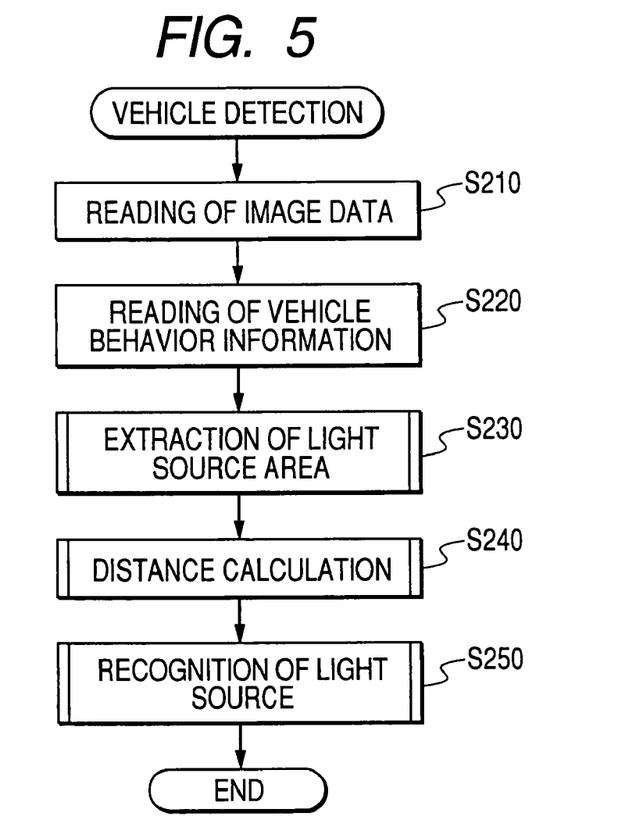
FIG. 5 is a flowchart showing details of a vehicle detecting process performed by the vehicle detecting apparatus.

FIG. 5 is a flowchart showing details of the vehicle detecting process. In this vehicle detecting process, a picture taken by the camera 10 is subjected to the image processing to extract a light source therefrom. And an existence of a preceding vehicle or an oncoming vehicle is determined on the basis of a type of the extracted light source.

This vehicle detecting process begins by reading image data of a picture of a view ahead of the host vehicle taken by the camera 10. As already explained, the image data includes signals indicative of luminances of pixels of the image sensor. Subsequently, information indicative of behavior of the host vehicle is read from the vehicle behavior sensor 20 at step S220.

At step S230, a high luminance area is extracted from the image data as a light source area. The high luminance area is an area throughout which luminance is higher than a predetermined threshold value. When there exists a plurality of such high luminance areas, they are all extracted. This light source area extracting process is explained in detail below with reference to the flowchart of FIG. 6.

Figure 6:
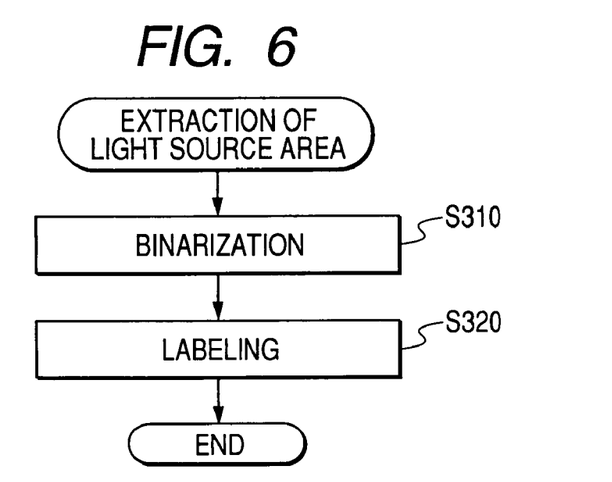
FIG. 6 is a flowchart showing details of a light source area extracting process performed by the vehicle detecting apparatus.

The light source extracting process begins by performing, at step S310, a binarizing process in which pixels having luminance equal to or higher than a predetermined threshold luminance are assigned with "1", and pixels having luminance lower than this predetermined threshold luminance are assigned with "0" in order to produce a binary image. Subsequently, at step S320, there is performed a labeling process in which neighboring pixels each assigned with "1" are assumed to constitute a light source area.

Returning back to FIG. 5, after completion of the light source extracting process, the vehicle detecting process proceeds to step S240 where there is calculated a distance to each light source causing an extracted light source area. This distance calculating process is explained below with reference to the flowchart of FIG. 7.

Figure 7:
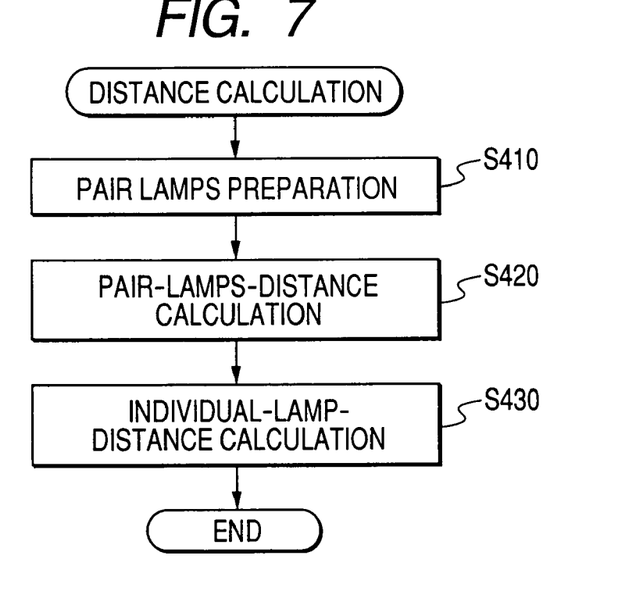
FIG. 7 is a flowchart showing details of a distance calculating process performed by the vehicle detecting apparatus.

In this distance calculating process, there are performed a pair-lamps-distance calculating process, and an individual-lamp-distance calculating process. In the pair-lamps-distance calculating process, the distance is calculated utilizing the fact that a vehicle is provided, as a headlight or taillight, with a pair of lamps spaced side-to-side. In the individual-lamp-distance calculating process, the distance is calculated when the distance is so far that any pair of the lamps are not recognized as separate lamps, but recognized as an individual lamp.

The distance calculating process begins by performing, at step S410, a pair lamps preparing process. In this pair lamps preparing process, when the image data outputted from the camera 10 includes two light source areas which are located closely to each other at about the same height, and have about the same size and shape, it is assumed that these two light source areas are caused by pair lamps. On the other hand, a light source area having no such counterpart is assumed to be caused by an individual lamp.

If the pair lamps have been prepared, a distance to the pair lamps is calculated by performing the pair-lamps-distance calculating process at step S420. In this embodiment, a distance between a left side lamp and a right side lamp of a headlight and a taillight is assumed to be a certain value of $w_0$ (1.6 m, for example). Since a focal length f of the camera 10 is known, the distance X to the pair lamps can be calculated by the equation of $X=f\cdot w_0/w_1$, where $w_1$ is a distance between the light source areas shown in the image sensor, which are caused by the pair lamps When an oncoming vehicle or a preceding vehicle is far from the host vehicle, its pair lamps are recognized as an individual lamp. The same is true for roadside reflectors. As for a light source area assumed not to be caused by pair lamps, the distance thereto is calculated by performing the individual-lamp-distance calculating process at step S430.

As already explained, the picture taking direction of the camera 10 is set to the predetermined reference direction in advance. Generally, a vehicle headlight and a vehicle taillight can be assumed to be at a certain distance (80 cm, for example) from the ground. Accordingly, when the road the host vehicle is driving on is flat, the distance to an individual lamp can be calculated on the basis of a distance from a bottom of the image data to a light source caused to be shown in the image data by this individual lamp. However, when the host vehicle pitches or rolls, the picture taking direction of the camera 10 deviates from the predetermined reference direction. Accordingly, in this embodiment, the position of the individual lamp is compensated for the deviation from the predetermined reference direction on the basis of the output of the vehicle behavior sensor 20, before calculating the distance to the individual lamp.

Returning back to FIG. 5, after completion of the distance calculating process, the vehicle detecting process proceeds to step S250 where there are calculated the first kind of the headlight likelihood, taillight likelihood, and reflector likelihood are calculated on the basis of the calculated distance to each light source and the luminance of each light source while referring to prestored likelihood curves as those shown in the graph of FIG. 3, and there are calculated the second kind of the headlight likelihood, taillight likelihood, and reflector likelihood on the basis of whether the headlight of the host vehicle is in the high-beam position or the low-beam position. Thereafter, the first kind of the likelihoods and the second kind of the likelihoods are multiplied by each other to produce integrated headlight, taillight and reflector likelihoods. And on the basis of these integrated likelihoods, it is determined which of a headlight, a taillight and a roadside reflector causes each extracted light source area. The luminance of each light source area, which is used for recognition thereof, may be its largest luminance, or its mean luminance.

Figure 8:
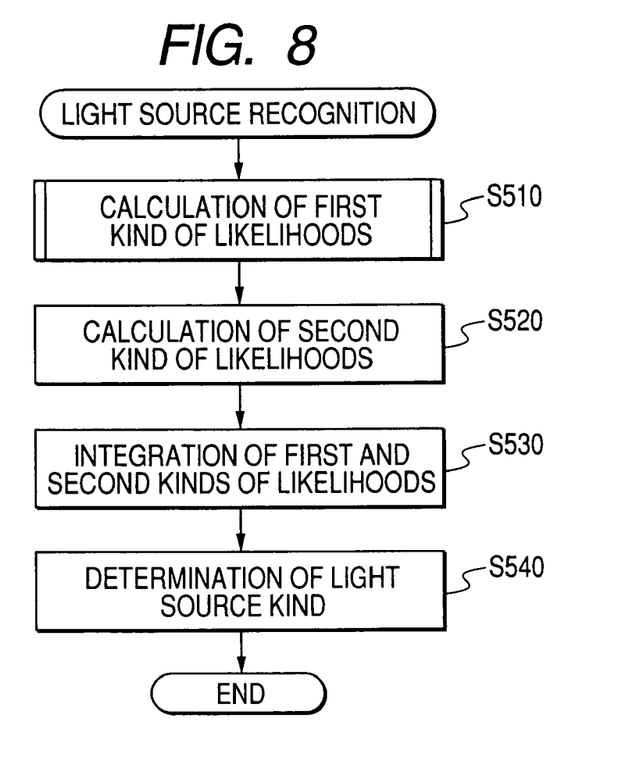
FIG. 8 is a flowchart showing details of a light source recognizing process performed by the vehicle detecting apparatus.

FIG. 8 is a flowchart showing details of the light source recognizing process performed at step S250. This light source recognizing process begins by calculating, at step S510, the first kind of the likelihoods for each light source area shown in the image data. Here, the process of calculating the first kind of the likelihoods is explained in detail with reference to the flowchart of FIG. 9.

Figure 9:
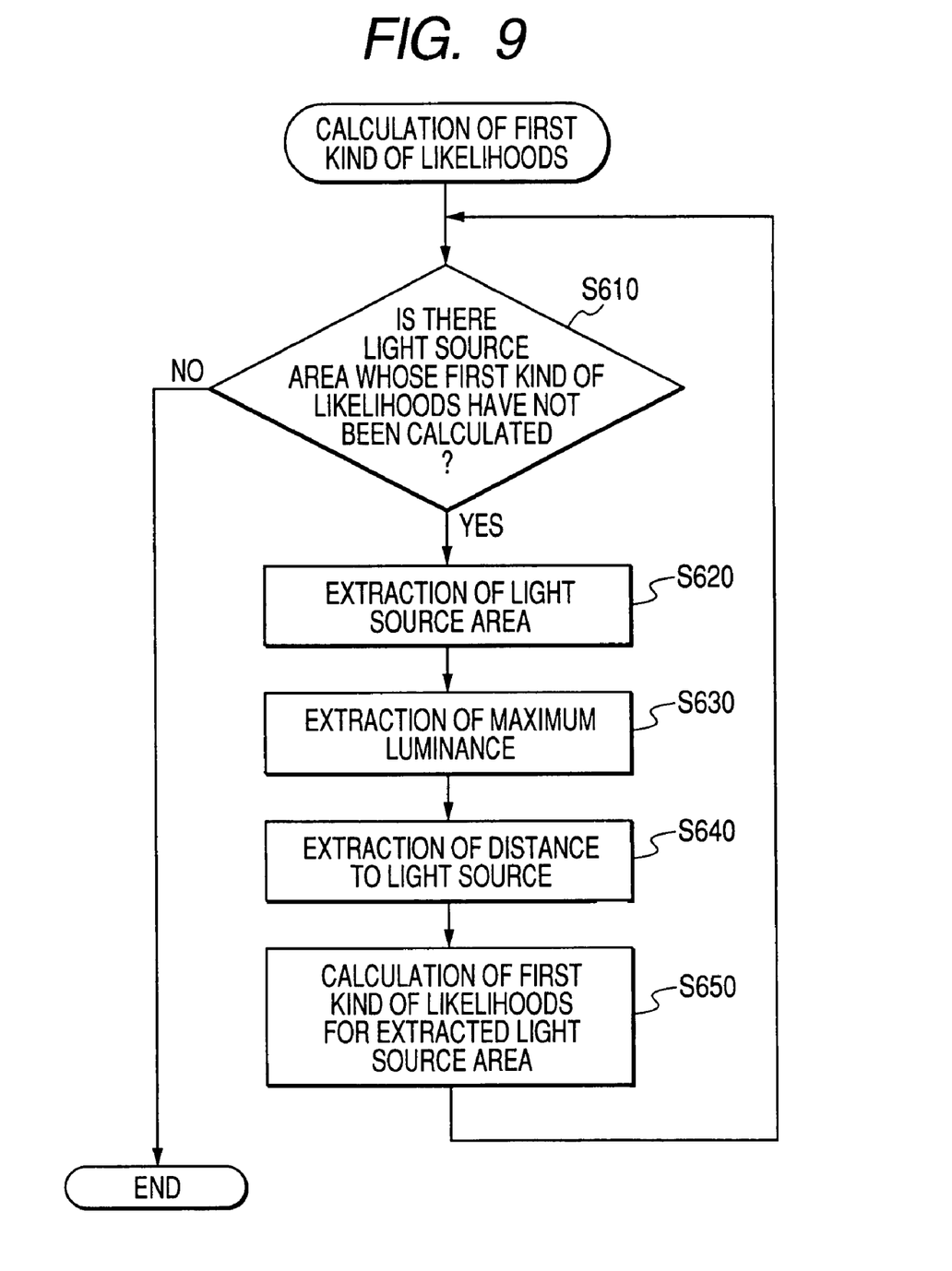
FIG. 9 is a flowchart showing details of a first kind likelihood calculating process performed by the vehicle detecting apparatus.

The first kind likelihood calculating process begins by judging, at step S610, whether there is any light source area whose first kind likelihoods have not been calculated. If the judgment at step S610 is negative, this process is terminated. If the judgment at step S610 is affirmative, the process proceeds to step S620.

At step S620, a light source area whose first kind of likelihoods have not been calculated is extracted from a memory. At step S630, a largest luminance value of this light source area is extracted. At step S640, the distance calculated at step S420 or at step S430 of the flowchart of FIG. 7 for this light source area is extracted.

At step S650, there are calculated the first kind of the headlight likelihood, taillight likelihood, and reflector likelihood on the basis of the extracted largest luminance value and the extracted distance while referring to prestored likelihood curves as those shown in the graph of FIG. 3.

Returning back to FIG. 8, after completion of the first kind likelihood calculating process, the light source recognizing process proceeds to step S520 where the second kind of the likelihoods are calculated on the basis of whether the headlight of the host vehicle is in the high-beam position or the low-beam position.

When the headlight of the host vehicle is in the high-beam position, the second kind of the headlight likelihood, taillight likelihood and reflector likelihood are calculated at the same value as shown in FIG. 10. That is because, when the headlight of the host vehicle is in the high-beam position, since the light of the headlight travels relatively a long distance, probabilities of appearances of a headlight of an oncoming vehicle, a taillight of a preceding vehicle, and a reflector in the image data as light source areas are roughly the same.

On the other hand, when the headlight of the host vehicle is in the low-beam position, the second kind of the likelihoods are so calculated that the headlight likelihood and the taillight likelihood become larger than the reflector likelihood. That is because, when the headlight of the host vehicle is in the low-beam position, since the light of the headlight travels relatively only a short distance, probabilities of appearances of a headlight of an oncoming vehicle, and a taillight of a preceding vehicle are larger than that of a roadside reflector.

After completion of the calculation of the first kind and the second kind of the likelihoods, they are integrated at step S530. More specifically, each of the first kind of the headlight likelihood, taillight likelihood and reflector likelihood is multiplied by a corresponding one of the second kind of the headlight likelihood, taillight likelihood and reflector likelihood. The integrated headlight likelihood, integrated taillight likelihood, and integrated reflector likelihood obtained by the multiplications indicates probabilities of an extracted light source area being caused by a headlight, a taillight, and a reflector, respectively, determined taking into consideration different viewpoints.

At subsequent step S540, it is judged which of the integrated headlight likelihood, integrated taillight likelihood, and integrated reflector likelihood is the largest, to determine which of a headlight, a taillight, and roadside reflector has caused the extracted light source area.

It is a matter of course that various modifications can be made to the above described embodiment as described below.

In the above described embodiment, a light source area caused by a headlight of an oncoming vehicle and a light source area caused by a taillight of a preceding vehicle are separately subjected to the likelihood calculation. However, the likelihood calculation may be performed only for a light source area caused by a headlight of an oncoming vehicle, or only for a light source area caused by a taillight of a preceding vehicle depending on each case. Furthermore, light sources areas respectively caused by a headlight and a taillight may be subjected to the likelihood calculation altogether in order to distinguish them from a light source area caused by a roadside reflector.

Although the first kind of the likelihooods are calculated for a detected light source from a distance to the light source a luminance of the light source in the above described embodiment, the calculation method of the first kind of the likelihoods is not limited thereto.

For example, the first kind of the headlight likelihood, taillight likelihood, and reflector likelihood can be calculated on the basis of a shape of an extracted light source area in the image data, because a headlight and a taillight are each constituted by a set of a left side lamp and a right side lamp, and accordingly, they are observed as a paired light source areas when the distance thereto is relatively short, and observed as a horizontally long light source area when the distance thereto is relatively long, while on the other hand, a headlight and a taillight, a light source area caused by a roadside reflector is square, or circular.

The embodiment may be so configured as to judge whether an extracted light source area is stationary or moving on the basis of the position of the light source area in a plurality of sets of the image data of pictures successively taken by the camera 10, and to calculate the first kind of the headlight or taillight likelihood, and the reflector likelihood on the basis of the result of the judgment. This is made possible by the fact that a roadside reflector is always stationary, while a headlight and a taillight may move.

In this case, when an extracted light source area is judged to be moving, the headlight and taillight likelihoods are calculated at a higher value, and the reflector likelihood is calculated at a lower value, while when the extracted light source area is judged to be stationary, the headlight, taillight, and the reflector likelihoods are calculated at the same value, because the stationary light source area may be caused by a headlight or a taillight of a stopped vehicle.

To correctly judge whether a light source area is stationary or moving, it is necessary to extract the same light source area caused by the identical light source from each of the plurality of the sets of the imaged data. Accordingly, in this case, vehicle behavior information outputted from the vehicle behavior sensor 20 is used. More specifically, to remove effects of the motion of the host vehicle, such as a traveled distance, driving direction change, and pitch angle change in a time period in which the camera 10 takes two pictures in succession, applied on the position of the light source area, the position of the light source area in either one of two successive sets of the image data is corrected in accordance with the output of the vehicle behavior sensor 20.

It is also possible to calculate the first kind of the likelihoods by performing the above described different calculation methods individually, and then combine the different calculation results in order to provide combined likelihoods. This is explained in more detail below. First, the first kind of the headlight likelihood, taillight likelihood, and reflector likelihood are calculated by the above described different methods individually. Next, multiplication is performed among a plurality of the calculated headlight likelihoods, among a plurality of the calculated taillight likelihoods, and among a plurality of the calculated reflector likelihoods. As a result, a combined headlight likelihood, a combined taillight likelihood, and a combined reflector likelihood are obtained.

According to this method in which the first kind of the likelihoods are calculated by the plurality of different calculation methods individually, and then combined one another, the reliability of the first kind of the likelihoods can be further increased.

In the above described embodiment, the second kind of the likelihoods are calculated depending on whether the headlight of the host vehicle is in the high-beam position or in the low-beam position. However, the second kind of the likelihoods may be calculated taking account of difference between the image data obtained when the headlight is in the high-beam position and the image data obtained when the headlight is in the low-beam position.

For example, for a light source area which does not appear in the image data when the headlight is in the low-beam position, and appears in the image data only when the headlight is in the high-beam position, the reflector likelihood may be calculated at a higher value than the headlight and taillight likelihoods for the reason explained below. A headlight of an oncoming vehicle or a taillight of a preceding vehicle is clearly shown in the image data regardless of whether the headlight of the host vehicle is in the high-beam position or in the low-beam position. It means that a light source area appearing in the image data when the headlight of the host vehicle is switched from the low-beam position to the high-beam position has a high probability of being caused by a roadside reflector.

In the following, there is explained in detail, with reference to the flowchart of FIG. 11, the process for calculating the second kind of the likelihoods taking account of difference between the image data obtained when the headlight is in the high-beam position and the image data obtained when the headlight is in the low-beam position. This process begins by judging, at step S710, whether the headlight of the host vehicle has been switched between the low-beam position and the high-beam position on the basis of the output signal of the headlight actuator device 40. If the judgment at step S710 is negative, the process proceeds to step S780 to calculate the second kind of the likelihoods on the basis of the illuminating position of the headlight as in the case of the above described embodiment. If the judgment at step S710 is affirmative, the process proceeds to step S720.

At step S720, a light source area is extracted from the image data obtained before the illuminating position switching and from the image data obtained after the illuminating position switching. At step S730, it is checked whether a light source area extracted from the image data obtained when the headlight was in the high-beam position (referred to as "high-beam position image data" hereinafter) exists also in the image data obtained when the headlight was in the low-beam position (referred to as "low-beam position image data" hereinafter). The time at which the high-beam position image data was taken is different from the time at which the low-beam position image data was taken. Accordingly, before checking whether the same light source area exists in both the high-beam position image data and the low-beam position image data, one of the positions of light source areas respectively extracted from the high-beam position image data and the low-beam position image data is corrected in accordance with difference between two signals which the vehicle behavior sensor 20 outputted at these different times, respectively.

At step S740, it is judged whether the extracted light source area is such that it exists only in the high-beam position image data. If the judgment at step S740 is affirmative, the process proceeds to step S750 where the second kind of the likelihoods are calculated such that the reflector likelihood becomes higher than the headlight or taillight likelihoods. If the judgment at step S740 is negative, the process proceeds to step S760.

If the light source areas respectively extracted from the high-beam position image data and the low-beam position image data are well corresponded with each other, it is highly probable that they are caused by a headlight of an oncoming vehicle or a taillight of a preceding vehicle. Accordingly, at step S760, the second kind of the likelihoods are calculated such that the reflector likelihood becomes lower than the headlight and taillight likelihoods.

At step S770, it is judged whether or not all of light source areas have been extracted from the high-beam position image data, and the second kind of the likelihoods have been calculated for each of them. If the judgment at step S770 is affirmative, the process shown in the flowchart of FIG. 11 is terminated.

Figure 11:
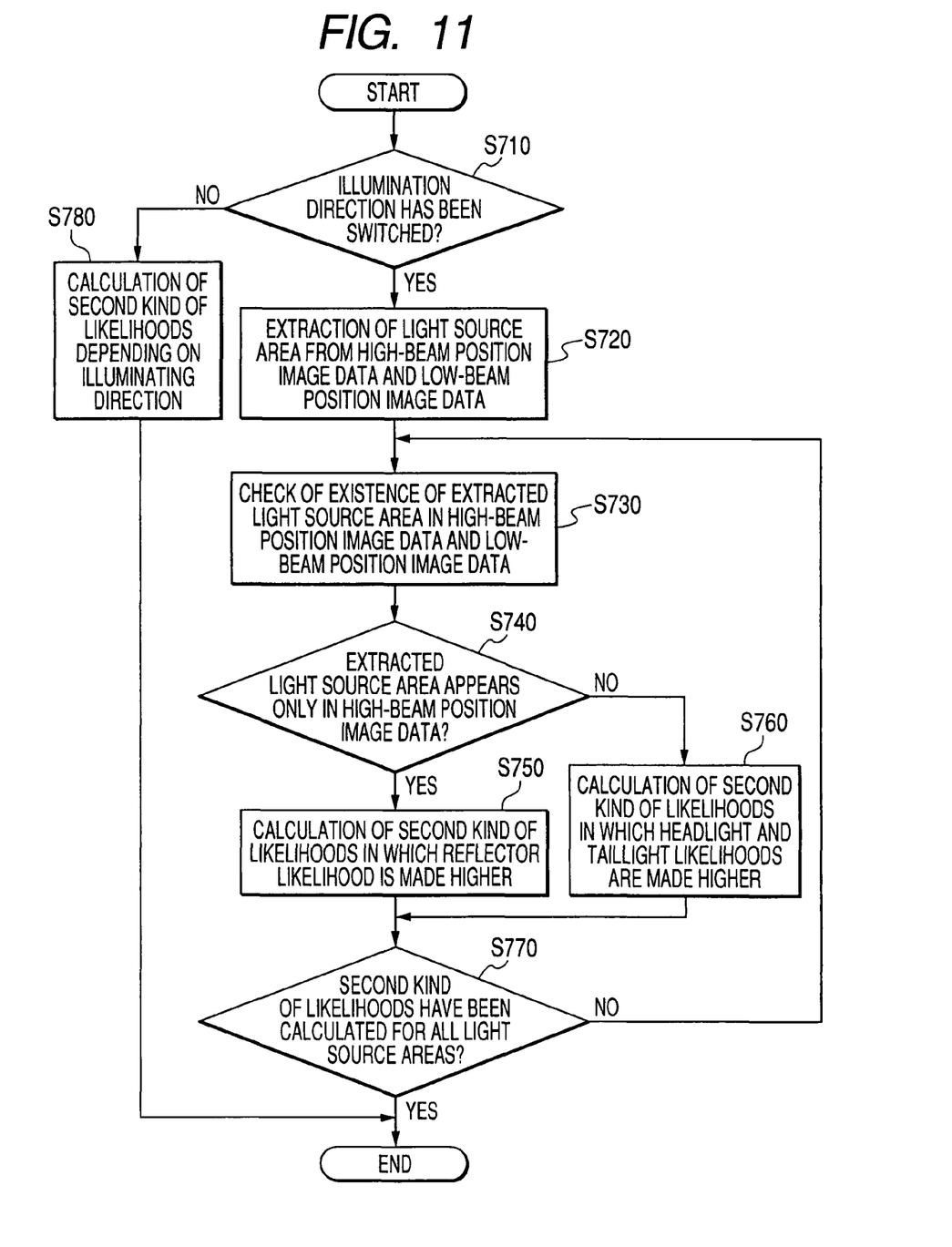
FIG. 11 is a flowchart showing details of a variant of a second kind likelihood calculating process performed by the vehicle detecting apparatus.

The process shown in FIG. 11 may be performed only when the headlight of the host vehicle has been switched from the low-beam position to the high-beam position.

As explained above, in the above described embodiment, when the headlight of the host vehicle is in the low-beam position, the second kind of the likelihoods are calculated such that the headlight and taillight likelihoods becomes higher than the reflector likelihood.

However, it can occur that even when the headlight of the host vehicle is in the low-beam position, a light source area caused by a roadside reflector appears in the low-beam position image data, if the roadside reflector is within an illumination range of the headlight of the host vehicle. Accordingly, the embodiment may be so modified as to measure a distance to a light source causing a light source area in the imaged data, and calculate the second kind of the likelihoods such that the headlight likelihood, taillight likelihood, and reflector likelihood all have the same value when the measured distance shows that the light source is within the illumination range of the headlight set in the low-beam position, and otherwise, such that the headlight likelihood and the taillight likelihood become larger than the reflector likelihood.

In the above described embodiment, although a distance to a light source causing a light source area in the image data is determined by subjecting the image data including the light source area to the pair-lamps-distance calculating process or individual-lamp-distance calculating process, it may be determined by use of a stereo camera, or a distance measuring sensor such as a radar sensor.

The above explained preferred embodiments are exemplary of the invention of the present application which is described solely by the claims appended below. It should be understood that modifications of the preferred embodiments may be made as would occur to one of skill in the art.

What is claimed is:

1. A vehicle detecting apparatus comprising:

an image sensor mounted on a host vehicle so as to be able to take an image ahead of said host vehicle and outputting image data representing said image;

a light source area extracting function of extracting, from said image data, an area having luminance higher than a predetermined value as a light source area;

a vehicle detecting function of detecting existence of at least one of an oncoming vehicle and a preceding vehicle by recognizing which of a headlight of said oncoming vehicle, a taillight of said preceding vehicle, and a roadside reflector causes said light source area in said image data; and a headlight axis position detecting function of detecting whether a headlight of said host vehicle is in a high-beam position or a low-beam position; wherein said vehicle detecting function is configured to lower a probability that said vehicle detecting function recognizes that said light source area is caused by said roadside reflector when said headlight of said host vehicle is detected to be in said low-beam position by said headlight axis position detecting function;

said vehicle detecting function has a first kind likelihood calculating function of calculating a first kind of a headlight likelihood indicative of a probability of said light source area being caused by said headlight of said oncoming vehicle, a first taillight likelihood indicative of a probability of said light source area being caused by said taillight of said preceding vehicle, and a first reflector likelihood indicative of a probability of said light source area being caused by said roadside reflector, and a second kind likelihood calculating function of calculating a second kind of a headlight likelihood indicative of a probability of said light source area being caused by said headlight of said oncoming vehicle, a second taillight likelihood indicative of a probability of said light source area being caused by said taillight of said preceding vehicle, and a second reflector likelihood indicative of a probability of said light source area being caused by said roadside reflector such that said second kind of said reflector likelihood becomes smaller than said second kind of said headlight and taillight likelihoods when said headlight of said host vehicle is detected to be in said low-beam position, said vehicle detecting function being configured to multiply each of said first kind of said headlight, taillight, and reflector likelihoods by corresponding one of said second kind of said headlight, taillight, and reflector likelihoods to produce an integrated headlight likelihood, an integrated taillight likelihood, and an integrated reflector likelihood, and to determine that said light source area is caused by said headlight of said oncoming vehicle or said taillight of said preceding vehicle if said integrated reflector likelihood is smaller than said integrated headlight and integrated taillight likelihoods.

2. The vehicle detecting apparatus according to claim 1, further comprising a distance detecting function of detecting a distance to a light source causing said light source area in said image data, said first kind likelihood calculating function being configured to calculate said first kind of said headlight, taillight, and reflector likelihoods on the basis of said distance to said light source and luminance of said light source area while referring to a prestored table defining said first kind of said headlight, taillight, and reflector likelihoods as functions of a distance to said light source and luminance of said light source area.

3. The vehicle detecting apparatus according to claim 2, wherein said distance detecting function is configured to detect said distance by utilizing a fact that a left side lamp and a right side lamp of a vehicle headlight or a vehicle taillight are spaced by about a certain distance.

4. The vehicle detecting apparatus according to claim 2, further comprising a vehicle behavior sensor detecting behavior of said host vehicle, said distance detecting function being configured to detect said distance to said light source on the basis of a position of said light source area in said image data while compensating for deviation of an image taking direction of said image sensor from a predetermined reference direction on the basis of behavior of said host vehicle detected by said vehicle behavior sensor.

5. The vehicle detecting apparatus according to claim 1, wherein said first kind likelihood calculating function calculates said first kind of said headlight, taillight, and reflector likelihoods on the basis of a shape of said light source area in said image data.

6. The vehicle detecting apparatus according to claim 1, wherein said first kind likelihood calculating function is configured to make a judgment as to whether said light source area is moving or stationary on the basis of a position of said light source area in a plurality of sets of image data successively taken by said image sensor, and to calculate said first kind of said headlight, taillight, and reflector likelihoods depending on a result of said judgment.

7. The vehicle detecting apparatus according to claim 1, wherein said first kind likelihood calculating function is configured to calculate said first kind of said headlight, taillight, and reflector likelihoods in accordance with different calculation methods individually, and perform multiplication among a plurality of said first kind of said headlight likelihoods calculated in accordance with said different calculation methods, among a plurality of said first kind taillight likelihoods calculated in accordance with said different calculation methods, and among a plurality of said first kind of said reflector likelihoods calculated in accordance with said different calculation methods, to thereby calculate a combined headlight likelihood, a combined taillight likelihood, and a combined reflector likelihood.

8. The vehicle detecting apparatus according to claim 1, wherein said second kind likelihood calculating function is configured to calculate said second kind of said headlight, taillight, and reflector likelihoods as the same value when said headlight of said host vehicle is detected to be in said high-beam position.

9. The vehicle detecting apparatus according to claim 1, wherein said second kind likelihood calculating function is configured to calculate said second kind of said headlight, taillight, and reflector likelihoods such that said second kind of said headlight and taillight likelihoods become higher than said second kind of said reflector likelihood when said headlight of said host vehicle is detected to be in said low-beam position.

10. The vehicle detecting apparatus according to claim 9, further comprising a distance detecting function of detecting a distance to a light source causing said light source area in said image data, said second kind likelihood calculating function is configured to calculate said second kind of said headlight, taillight, and reflector likelihoods such that said second kind of said headlight and taillight likelihoods become higher than said second kind of said reflector likelihood when said distance measured by said distance detecting function is longer than a predetermined distance.

11. The vehicle detecting apparatus according to claim 1, wherein said second kind likelihood calculating function is configured to calculate said second kind of said headlight, taillight, and reflector likelihoods such that said second kind of said reflector likelihood becomes higher than said second kind of said headlight and taillight likelihoods when said light source area is such that said light source area does not appear in image data taken by said image sensor when said headlight of said host vehicle is in said low-beam position, and appears in image data taken by said image sensor after switching of said headlight of said host vehicle from said low-beam position to said high-beam position.

12. A vehicle headlight control system comprising:
an image sensor mounted on a host vehicle so as to be able to take an image ahead of said host vehicle and outputting image data representing said image;
a light source area extracting function of extracting, from said image data, an area having luminance higher than a predetermined value as a light source area;
a vehicle detecting function of detecting existence of at least one of an oncoming vehicle and a preceding vehicle by recognizing which of a headlight of said oncoming vehicle, a taillight of said preceding vehicle, and a roadside reflector causes said light source area in said image data;
a headlight axis position detecting function of detecting whether a headlight of said host vehicle is in a high-beam position or a low-beam position; and
a headlight actuator device controlling said illuminating position between said high-beam position and said low-beam position in accordance with a detection result by said vehicle detecting function; wherein
said vehicle detecting function is configured to lower a probability that said vehicle detecting function recognizes that said light source area is caused by said roadside reflector when said headlight of said host vehicle is detected to be in said low-beam position by said headlight axis position detecting function;
said vehicle detecting function has a first kind likelihood calculating function of calculating a first kind of a headlight likelihood indicative of a probability of said light source area being caused by said headlight of said oncoming vehicle, a first taillight likelihood indicative of a probability of said light source area being caused by said taillight of said preceding vehicle, and a first reflector likelihood indicative of a probability of said light source area being caused by said roadside reflector, and a second kind likelihood calculating function of calculating a second kind of a headlight likelihood indicative of a probability of said light source area being caused by said headlight of said oncoming vehicle, a second taillight likelihood indicative of a probability of said light source area being caused by said taillight of said preceding vehicle, and a second reflector likelihood indicative of a probability of said light source area being caused by said roadside reflector such that said second kind of said reflector likelihood becomes smaller than said second kind of said headlight and taillight likelihoods when said headlight of said host vehicle is detected to be in said low-beam position,
said vehicle detecting function being configured to multiply each of said first kind of said headlight, taillight, and reflector likelihoods by corresponding one of said second kind of said headlight, taillight, and reflector likelihoods to produce an integrated headlight likelihood, an integrated taillight likelihood, and an integrated reflector likelihood, and to determine that said light source area is caused by said headlight of said oncoming vehicle or said taillight of said preceding vehicle if said integrated reflector likelihood is smaller than said integrated headlight and integrated taillight likelihoods.

* * * * *